(12) United States Patent
Mattmann et al.

(10) Patent No.: US 6,269,534 B1
(45) Date of Patent: Aug. 7, 2001

(54) METHOD FOR PRODUCING AN ELECTRIC RESISTOR AND A MECHANO-ELECTRIC TRANSDUCER

(75) Inventors: Erich Mattmann, Heidesheim; Klaus Weber, Kronberg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/204,819

(22) Filed: Dec. 3, 1998

(30) Foreign Application Priority Data

Dec. 4, 1997 (DE) .............................. 197 53 800

(51) Int. Cl.[7] .................................... M01C 17/28
(52) U.S. Cl. .............. 29/621.1; 29/620; 338/4; 427/103
(58) Field of Search .................. 29/620, 621.1; 338/4, 5; 427/103; 264/272.18, 316; 156/344

(56) References Cited

U.S. PATENT DOCUMENTS 5,349,746 * 9/1994 Gruenwald et al. ............... 29/620
5,480,503 * 1/1996 Casey et al. ....................... 156/89

FOREIGN PATENT DOCUMENTS 4719089  2/1972  (DE) .
9006575  8/1998  (DE) .

* cited by examiner

*Primary Examiner*—Lee Young
*Assistant Examiner*—Sean Smith
(74) *Attorney, Agent, or Firm*—Mayer, Brown & Platt

(57) ABSTRACT

A method for producing an electric resistor, in particular a resistance strain gauge, in which an insulating layer and a resistive layer are sequentially applied to a carrier element. The insulating layer or the resistive layer is applied to a backing sheet, the side of the backing sheet carrying the insulating or resistive layer being covered with a flexible film layer whose adhesion to the insulating layer or resistive layer is stronger than the adhesion of the backing sheet to the insulating layer or resistive layer. The film layer with the insulating or resistive layer is peeled off of the adhesive backing sheet and applied to a carrier element, which is heated to burn off the film layer and sinter on the insulating or resistive layer.

5 Claims, 2 Drawing Sheets

METHOD FOR PRODUCING AN ELECTRIC RESISTOR AND A MECHANO-ELECTRIC TRANSDUCER

FIELD OF INVENTION

The invention relates to a method for producing an electric resistor, in particular a resistance strain gauge, in which an insulating layer and a resistive layer are sequentially applied to a carrier element, as well as to a method for producing a mechano-electric transducer with a resistor thus produced.

BACKGROUND OF THE INVENTION

In accordance with DE 34 29 649 A1, such resistors, which can be used as resistance strain gauges, are known. Such a resistor has a resistive layer applied to a carrier, an electrically non-conducting layer being arranged between the carrier and resistive layer.
The resistive layer and/or the non-conducting layer is either vapor deposited or sputtered onto the carrier.

The carrier to which the layer structure explained above is applied is a small surface in this case. Should such a structure be applied to non-flat surfaces, the mode of procedure described above is no longer possible, since conformity with previously accurately dimensioned electrical properties is no longer ensured.

It is therefore the object of the invention to specify a method for producing an electric resistor which can be applied reliably to carrier elements with non-flat surfaces.

SUMMARY OF THE INVENTION

According to the invention, the object is achieved by virtue of the fact that the insulating layer or the resistive layer is applied to a backing sheet, the side of the backing sheet carrying the insulating layer or resistive layer being covered with a flexible film layer whose adhesion to the insulating layer or resistive layer is stronger than the adhesion of the backing sheet to the insulating layer or resistive layer, and the film layer is peeled with the insulating layer or resistive layer from the backing sheet and applied to the carrier element, the carrier element being heat treated to burn out the film layer and sinter on the insulating layer or resistive layer.

The advantage of the invention consists in that the existing structure is produced on a carrier material in the form of the backing sheet and, after production, is placed on the carrier element with the aid of the transport film in the manner of a decal. Because of this mode of procedure, the desired layer structure can be mounted on any conceivable geometrical shape of the carrier element, and can be sintered to form an adhesively strong layer during the subsequent heat treatment.

A resistor is produced in this way, which adheres reliably to non-flat surfaces of carrier elements even during longlasting mechanical and thermal loading. This is particularly advantageous when the carrier element is a component which is to be mechanically loaded and consists of sinterable material.

It is advantageous for the insulating layer or the resistive layer to be applied to the backing sheet using a printing technique and to be dried. As a result, it is possible not only for simple unstructured layers, but also for structured patterns such as entire resistor networks to be applied to a non-flat surface of a carrier element.

It is possible with the aid of such a production method to produce roll-on structures which have dimensions specified by a computer and which acquire their necessary geometrical structure and tolerances only upon being applied to the non-flat surface.

In a development, after the application of the insulating layer to the backing sheet a resistive layer is applied to this insulating layer, the film layer completely covering the insulating layer and the resistive layer subsequently being arranged.
In this embodiment, both the insulating layer and the resistive layer are arranged on a single backing sheet and are transported with only one film layer.

In one embodiment, the insulating layer is printed onto the backing sheet in the form of a glass frit, and after the drying of the glass frit a conductive paste is printed as resistive layer onto the insulating layer and dried, the film layer subsequently being applied in the form of a synthetic resin film.

As an alternative to this, an insulating layer arranged on a first backing sheet and dried is applied to the carrier element by means of the film layer and heat treated, and subsequently the resistive layer printed on a second backing sheet and dried is arranged on the already heat-treated insulating layer with the aid of a second film layer positioned on it, and subsequently likewise heat treated.

The method has the advantage, depending on the application, both that the entire structure can be produced on one backing sheet and can be transported onto the carrier element from the backing sheet by means of a single film layer, or that also each layer of the structure can be produced individually on a backing sheet. The individually produced layer is likewise positioned on the carrier element by means of a film.

In a method for producing a mechano-electric transducer which has strain-sensitive precision resistors which are applied to an insulating layer arranged on a carrier element, the precision resistors and structures of an electronic evaluation system are applied to a common insulating layer, at least the insulating layer being applied to a backing sheet, the side of the backing sheet carrying the insulating layer being covered with a flexible film layer whose adhesion to the insulating layer is stronger than the adhesion of the backing sheet to the insulating layer, the film layer being peeled with the insulating layer from the backing sheet and applied to the carrier element, the carrier element being heat treated for the purpose of burning out the film and sintering on the insulating layer.

It is possible with the aid of such production methods for very small sensor structures to be applied simply and correctly even to angular structures of the carrier element.

In a refinement, before the application of the film layer, the insulating layer, a conductor track layer and, thereupon, a patterned resistive layer which has the strain-sensitive precision resistors and thick-film resistors of the electronic evaluation system are sequentially printed onto the backing sheet and dried, the film layer completely covering the arrangement of insulating layer, conductor track layer and patterned resistive layer, and this arrangement being removed from the backing sheet with the aid of the film layer and being placed on the carrier element such that the insulating layer makes direct contact with the carrier element.

The advantage of this method consists in that the entire sensor structure is positioned on the carrier element in one step.

In order to ensure the adhesion of this sensor structure to the carrier element, the carrier element is wetted with a primer before the insulating layer is placed on.

Particularly if the carrier element is the component which is to be mechanically loaded, the insulating layer is arranged directly on the component to be mechanically loaded owing to the elimination of an intermediate carrier. The mechanical load to be detected is tapped in this case directly from the component to be loaded without occurrence of signal corruptions caused by the intermediate carrier. The insulating layer and the component to be mechanically loaded are intimately interconnected by the subsequent heat treatment.

In another development, after the heat treatment of the insulating layer on the carrier element, the conductor track layer produced on a second backing sheet is peeled from this second backing sheet with the aid of the second film layer arranged over this conductor track layer, and positioned on the insulating layer and the carrier element is subsequently subjected to further heat treatment, and, after this heat treatment of the conductor track layer, the patterned resistive layer produced on a second backing sheet is applied to the conductor track layer by means of a third film layer covering this patterned resistive layer, and is likewise heat treated. Each layer can thus be produced individually and be sintered individually on the carrier element. This has the advantage, in particular for the patterned resistive layer, that changes in resistance which arise from the contraction of the insulating layer during the sintering process can be reliably eliminated when the patterned resistive layer is sintered on in a separate thermal step.

The possibility of producing individual layers offers a wider range of variation in the sensor structure, since the individual layers can be prefabricated and, depending on the application, a desired sensor element can be produced.

This method of production has the advantage that the individual structures can be prefabricated on a single backing sheet in large numbers, it being possible for a carrier sheet of A5 size to hold up to 400 pieces of such structures.

DESCRIPTION OF THE DRAWINGS

The invention permits numerous embodiments. One of these is to be explained in more detail with the aid of the figures represented in the drawing, in which.

DETAILED DESCRIPTION OF THE PREFERRED EMBODIMENT

Figure 1:
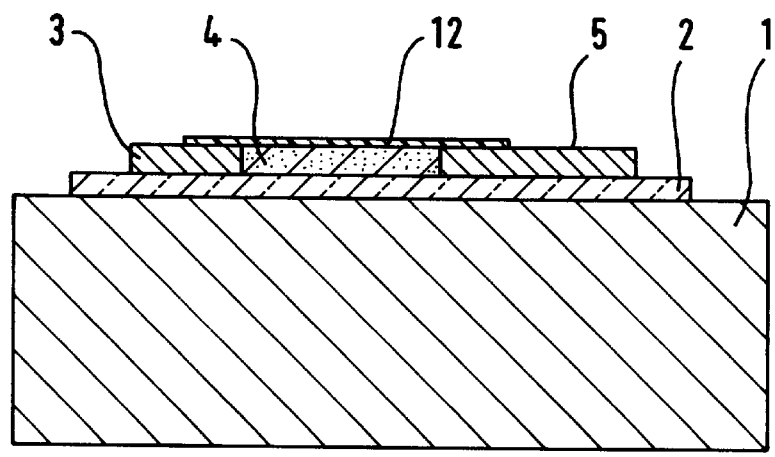
FIG. 1 shows a strain-sensitive precision resistor.

The resistance strain gauge represented in FIG. 1 has a carrier 1 which consists of steel and to which a dielectric 2 is applied. A conductor track 3 with contact surfaces 5 for electrically connecting the resistor to other circuit parts is arranged on the dielectric 2. The strain-sensitive precision resistor 4 is, in turn, positioned over the conductor track 3. The closure is formed by a passivation layer 12 which leaves only the contact surface 5 uncovered. The carrier 1 is in this case a shaft on which the strain experienced by the surface because of a mechanical load on it is tapped directly by the resistance strain gauge.

Figure 3:
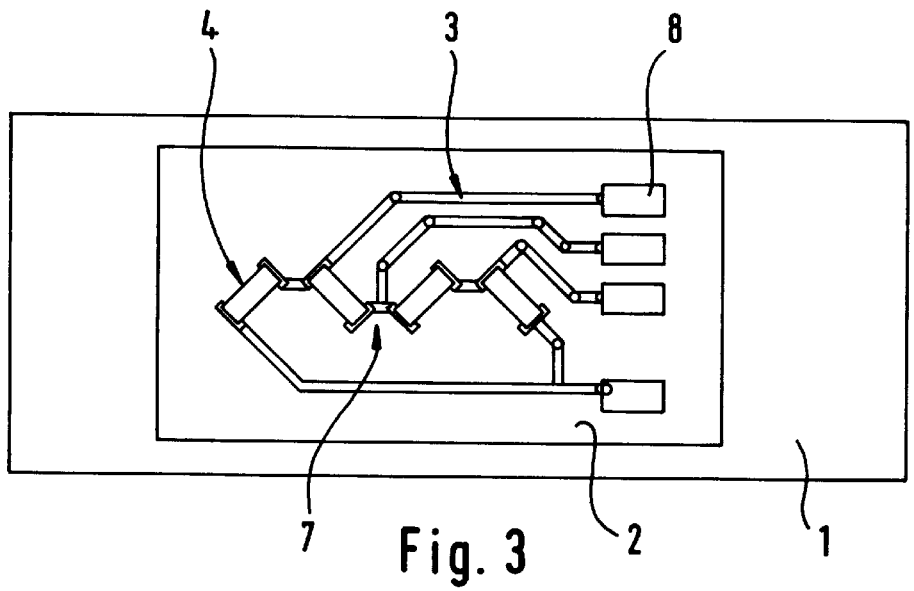
FIG. 3 shows a plan view of a measuring bridge produced using thick-film technology and having strain-sensitive resistors.

Represented in FIG. 3 is an arrangement for a strain-sensitive resistor which is produced separately from the actual carrier element, the shaft 1, and subsequently applied to said shaft 1.

Figure 2:
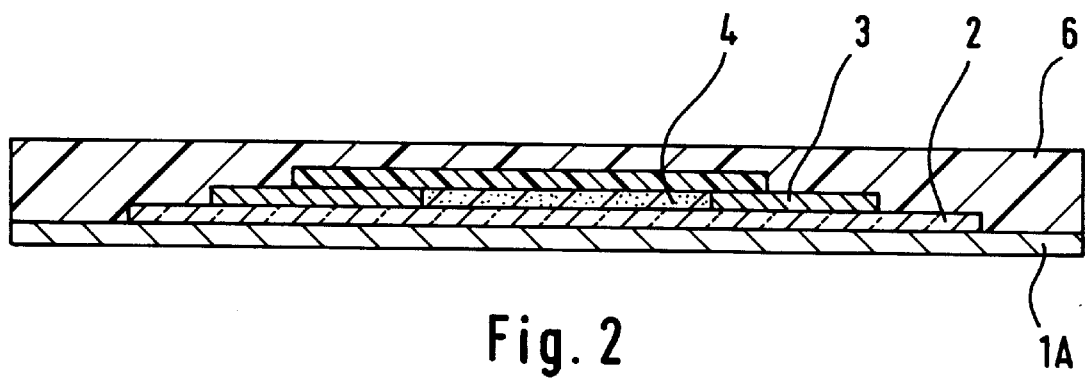
FIG. 2 shows a cross section through a strain-sensitive precision resistor arranged on a backing sheet.

Referring to FIG. 2, using the screen printing method, a non-conducting paste is applied as insulating layer 2 to a backing sheet 1A, for example a commercially available waxed paper, and is dried. The paste contains a glass frit which can be sintered at a lower temperature than the material of the shaft 1. After the paste dries, the conductor track 3 is also printed on by screen printing and dried, and subsequently a conducting paste containing platinum particles is printed onto the conductor track layer 3 in order to produce the resistive layer 4. After the drying of this resistive layer 4, the entire structure, comprising the dielectric 2, conductor track 3 and resistor 4, is completely covered with a flexible synthetic resin layer 6, which acts as a film. This film 6 adheres with its edges to the backing sheet 1A.

This prepared arrangement is now removed from the backing sheet 1A in accordance with the principle of a decal by using the flexible film layer 6 as a transport aid for the structure 2, 3, 4.

Since the adhesion of the dielectric 2 to the backing sheet 1A is substantially weaker than the adhesion to the flexible film layer 6, upon separation from the backing sheet 1A and the flexible film layer 6 the entire resistor structure and the dielectric 2 still remain on the film layer 6.

This film layer 6 is placed on the carrier 1 such that the dielectric 2 comes directly into contact with the carrier 1. Since the film layer 6 projecting over the dielectric 2 has adhesive properties, the arrangement described remains in its position applied to the carrier 1.

Before the structure is applied to the shaft 1, the steel is wetted with a primer in order to fix the dielectric 2 more effectively on the shaft 1. During the high temperature process following thereupon, the flexible film layer 6 burns or gasifies at a temperature of approximately 300° C. During a further increase in temperature to approximately 700–900° C., the glass layer of the dielectric 2 sinters with the surface of the shaft 1. During this process of sintering on, oxide bridges are formed between the dielectric 2 and the shaft 1 and ensure a direct connection between the shaft 1 and dielectric 2.

After the flexible film layer 6 has been gasified without a residue, the structures remain on the shaft 1 in the form of insulating layers, conductor track layers and resistive layers.

By contrast with the bonding technology, this rigid intimate connection gives rise to a smaller strain hysteresis.

Because of the backing sheet 1A, the arrangement is very practical in handling since there is no risk of inadvertently bonding the flexible film layer 6 before the backing sheet 1A is peeled off.

FIG. 3 represents a thick-film torque sensor device as is used in servo systems of motor vehicles, in particular in electric steering servo systems and electrohydraulic steering servo systems.

The component 1 to be loaded is configured in this case in the shape of a cuboid. Arranged on the component 1 is a dielectric 2 to which a resistance measuring bridge 7 with precision resistors 4 acting as resistance strain gauges are applied. The resistance measuring bridge 7 consists in a known way of 4 resistors 4 which are connected via conductor tracks 3 with electric contact surfaces 8 of the resistance measuring bridge 7.

In this case, the dielectric 2 is arranged in the middle on the rectangular surface of the shaft 1, in the region where the surface strain can be most clearly selected in the case of mechanical stressing of the shaft 1. The resistors 4 of the resistance measuring bridge 7 are arranged here in a fashion resembling a W and respectively in a row one behind another along the direction in which the zone of maximum stress of the shaft 1 extends. The strain of the mechanically loaded component (shaft 1) is measured directly by the resistance strain gauge measuring bridge 7. The electronic system for evaluating the sensor element and for transmitting the signal is likewise realized directly on the dielectric 2 on the shaft 1, and this is represented diagrammatically in FIGS. 3+4.

Figure 4:
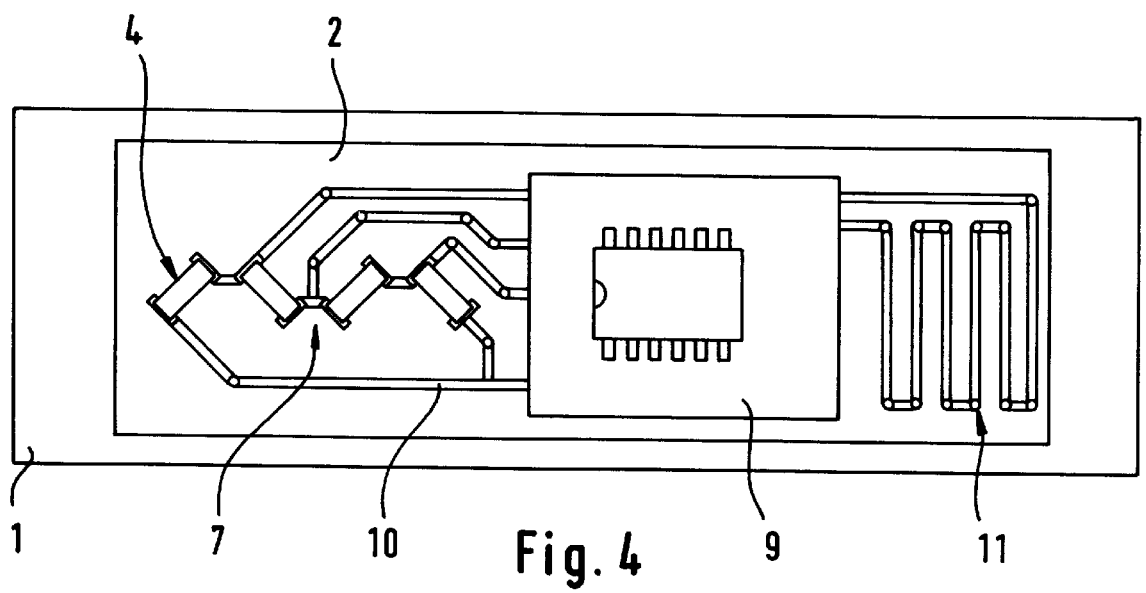
FIG. 4 shows a plan view of a mechano-electric transducer produced using hybrid technology.

As may be gathered from FIG. 4, the applied resistance measuring bridge 7 is connected to the electronic evaluation system 9 via a conductor track 10. The electronic evaluation system 9 comprises discrete components which are connected to the resistance measuring bridge 7 at the contact surfaces 8 represented in FIG. 3.

Using thick-film technology, a coil 11 is likewise printed onto the dielectric 2 for the purpose of contactless signal transmission.

Contacting the electronic evaluation system is preferably performed in this case on the contact surfaces 8 by surface mounting (SMD technology).

The structures represented in FIGS. 3 and 4 can be prefabricated on a backing sheet, exactly as explained in connection with FIG. 1.

The example of the electromechanical transducer shows that the structures applied to the backing sheet can be very multifarious.

In the present case, the dielectric 2 is applied to the backing sheet 1A over the entire surface in the form of a non-conducting paste. Thereafter, a low-resistance conductive paste with the structure of the conductor tracks 3 and the contact surfaces 8 is printed onto the dielectric 2 using the screen printing method. After this conductor track layer 3 has dried, a high-resistance conductive paste with the structures of the precision resistors 4, the coil 11 and thick-film resistors (not represented in more detail) of the electronic evaluation system 9 is printed on and dried. Subsequently, a synthetic resin film 6 completely covering the structures 3, 4, 11 is applied in a manner resembling FIG. 2.

The entire structure is peeled off the backing sheet 1A with the aid of this layer 6 and positioned on the shaft 1.

It has proved to be advantageous at this juncture that the dielectric 2 is produced individually on a backing sheet 1A and transferred by means of a film to the shaft 1 and subjected to a high temperature process, the dielectric 2 being sintered with the steel carrier 1.

The conductor track layer 3 and the patterned resistive layer 4 are produced in a further step on the same backing sheet or another one and not applied to the dielectric 2 until the high temperature treatment of the latter is terminated, and are subjected to a further high temperature treatment.

The sequence of the layer structure of the mechano-electric transducer corresponds to the sequence, represented in FIG. 2, of the layers of the resistance strain gauge, with the difference that the layers of the mechano-electric transducer according to FIGS. 3 and 4 are structured multifariously.

What is claimed is:

1. A method for producing a mechano-electric transducer with strain-sensitive precision resistors which are applied to an insulating layer arranged on a carrier element comprising:

applying the precision resistors (4) and structures of an electronic evaluation system (9) to a common insulating layer (2), applying at least the insulating layer (2) to a backing sheet (1A), covering the side of the backing sheet (1A) carrying the insulating layer (2) with a flexible film layer (6) whose adhesion to the insulating layer (2) is stronger than the adhesion of the backing sheet (1A) to the insulating layer (2), peeling the film layer (6) with the insulating layer (2) from the backing sheet (1A), applying the film layer (6) with the insulating layer (2) to the carrier element (1), and heat treating the carrier element for the purpose of burning out the film layer (6) and sintering on the insulating layer (2).

2. The method as claimed in claim 1, further comprising:

before the step for applying the film layer (6), sequentially printing the insulating layer (2), a conductive track layer (3) and, thereupon a patterned resistive layer which contains the strain-sensitive precision resistors (4) and thick-film resistors of the electronic evaluation system (9) onto the backing sheet (1A), drying the backing sheet (1A), subsequently applying a film layer (6) covering all the elements, removing the insulating layer (2) with the arrangement of conductor track layer (3) and patterned resistive layer (4) from the backing sheet (1A) with the aid of the film layer (6), and placing the insulating layer (2) with the arrangement of conductor track layer (3) and patterned resistive layer (4) on the carrier element (1) such that the insulating layer (2) makes direct contact with the carrier element (1).

3. The method as claimed in claim 2, further comprising wetting the carrier element (1) with a primer before the placinq step.

4. The method as claimed in claim 1, wherein the carrier element (1) is a component which is mechanically loaded.

5. The method as claimed in claim 1, wherein the carrier element (1) consists of sinterable material.

* * * * *